J. E. LAGERGREN.
LOCKING DEVICE.
APPLICATION FILED MAR. 20, 1906.
998,852.
Patented July 25, 1911.
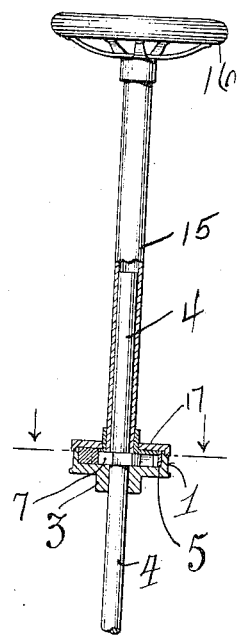
Fig. 1.
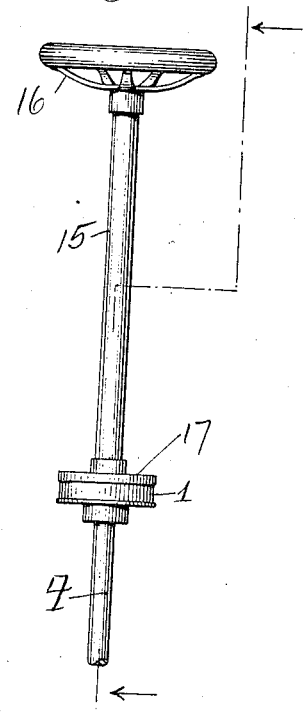
Fig. 2.
Fig. 5.
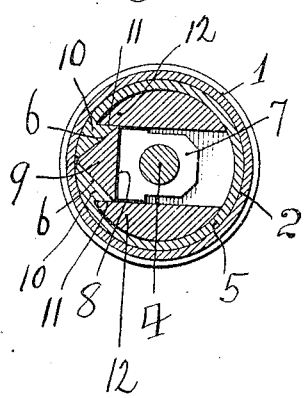
Fig. 3.
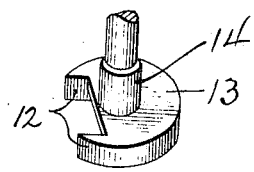
Fig. 4.
Attest:
Edgeworth Greene
Chas. R. Chute
Inventor:
John E. Lagergren,
by Richard W. Barkley,
Atty.

UNITED STATES PATENT OFFICE.

JOHN E. LAGERGREN, OF BROOKLYN, NEW YORK, ASSIGNOR TO CHRISTIAN W. SCHILDWACHTER AND GEORGE J. REESSING, OF NEW YORK, N. Y.

LOCKING DEVICE.

998,852. Specification of Letters Patent. Patented July 25, 1911.

Application filed March 20, 1906. Serial No. 307,034.

*To all whom it may concern:*

Be it known that I, JOHN E. LAGERGREN, a citizen of the United States, and a resident of Brooklyn borough, in the county of Kings and State of New York, have invented a certain new and useful Improvement in Locking Devices, of which the following is a specification.

This invention relates to a locking device suitable for use in many places, such as elevators, steering-heads of vehicles, the rudders of boats and other vessels, hand-operated brakes, etc., the primary object being to prevent a rotatable part from moving in either direction while permitting said part to be moved at will by power applied from one side thereof but not from the other; and other objects, as will appear hereinafter.

The invention consists in the combinations of devices hereinafter described and more particularly pointed out in the appended claims.

The invention is embodied in the device illustrated in the accompanying drawing, forming part hereof, in which—

Figure 1 is an elevation, partly in section; Fig. 2 is an elevation; Fig. 3 is a plan view in section; Fig. 4 is a perspective view of operating jaws; and Fig. 5 illustrates a modification.

The reference numeral 1 marks a fixed member which is provided with an inside friction- or locking-surface 2, the said member being shown as furnishing a bearing 3 for a shaft 4. The member 1 may be a flange fixed to any convenient fixed part (not shown). Within the member 1 is a ring-segment 5 whose ends are shown, in Fig. 3, as by being enlarged inwardly of the ring and such projections 10 are provided with opposite faces 6 parallel with the axis of the shaft 4, but at an acute angle with each other, the opening between said faces being toward said shaft 4.

The reference 7 marks a rotatable member which it is desired to lock against motion in either direction. In the instance shown in the drawing, the member 7 has a face 8 opposite the opening of the angle between the faces 6, and, in the form shown in Figs. 1 to 4, a triangular ring-expander 9 is inserted in the triangular space formed by said faces 6 and 8, there being a little play between the said expander and the face 8, as is indicated in Fig. 3 by the dark line between the expander and the member 7. If now an attempt is made (except as hereinafter described) to turn the member 7 in either direction, the face 8 forces the expander 9 outward, thus spreading the ends of the ring-segment and forcing that segment firmly against the inside surface of the flange or member 1, and locking the whole together so that the member 7 cannot turn. If, however, force be applied at either end of the segment, in a tangential direction and toward the opening between the ends of the segment, the said ring-segment, the expander 9, and the member 7 are all moved together, and, on being released from such force, the parts are ready in the new position to lock the member 7 as above described. The heads or projections 10 aforesaid are shown, in Fig. 3, as having faces 11 at angles with the faces 6 aforesaid, and the described circular motion of the ring-segment, expander, and member 7 may be imparted by pushing against either face 11, as by the jaws 12. These jaws 12 are shown as being formed in one with or attached to a plate 13, and said plate as connected by a sleeve 14 to a hollow shaft 15. The shaft 4, for convenience, extends above the member 7, and the hollow shaft 15 fits over said extension and is guided thereby. But such extension and such guiding are not essential to this invention, but the guiding may be done otherwise. The shaft 15 is provided with a lever, shown as a hand-wheel 16, whereby it may be turned in either direction. A retainer cap 17 fits down over the flange 1 and the sleeve 14 to prevent accidental displacement of the expander 9 and to exclude dirt, etc.

In the modification shown in Fig. 5, the ring-segment surrounds the friction-surface 2ˣ, and its ends are formed into or are provided with pins or projections 10ˣ, which stand to one side of the ring and above the level of the member 1, while the sliding block 9ˣ is provided with a pair of inclined jaws, or faces 6ˣ which, as the member forces the block 9ˣ outward, draw the segment ends toward each other and so cause the segment to grip the surface 2ˣ. The operating wrench, in this case, acts on the block 9ˣ in rotating the member 7, the segment, and the block 9ˣ.

The member 7 being fast on the shaft 4, the said shaft may operate the steering-gear of a vehicle or a vessel or boat, and such gear will remain where put by the one operating the hand-wheel 16, while being movable to another position at will. If the shaft 4 actuates a brake-mechanism, such mechanism will remain on or off, as the case may be, until the locking device is operated or released intentionally. If the shaft 4 operates the cable-winding devices of an elevator and the power is applied through the shaft 15, the failure of the power (as an electric current) will not cause the elevator to fall. Other applications of the invention are included within its scope.

It is noted that there must be some play between the member 7 and the wrench or jaws 12 in order to allow the member 7 to move the block or expander 9 far enough to lock before the sides of the member 7 strike the jaws to move them. Such play is indicated in Fig. 3 by the heavy lines between said parts.

What I claim as new and desire to secure by Letters Patent of the United States is—

1. The combination with a fixed circular flange, of a ring-segment adapted to coact therewith frictionally and having projections at its ends, a rotatable member having the same axis of motion as said ring, and a ring-operator coacting with said end-projections and actuated by said rotatable member, one of said ring-operator and end-projection elements having faces oblique to each other and the angle thereof opening toward said axis of motion, whereby said rotatable member is locked against rotation by force acting through it.

2. The combination with a fixed circular flange, of a ring-segment within the same and adapted to coact therewith frictionally, projecting ends on said ring provided with oblique faces opening toward the center of the ring, a rotatable member within the ring which it is desired to lock and provided with a straight face, and a triangular block interposed between said face and said oblique faces, whereby said rotatable member is locked against rotation by force acting through it.

3. The combination with a member provided with a friction-surface, a segment-ring adapted to be brought into frictional contact with said surface and provided with projections at the ends thereof, a rotatable member which it is desired to lock, a block operated by said rotatable member and provided with faces oblique to each other and coacting with said projections to force said segment-ring into frictional contact with said friction-surface, whereby said rotatable member is locked against rotation by force acting through it.

Signed at New York in the county of New York and State of New York this ninth day of March, A. D. 1906.

JOHN E. LAGERGREN.

Witnesses:
ENOCH RECTOR,
R. W. BARKLEY.

---

Copies of this patent may be obtained for five cents each, by addressing the "Commissioner of Patents, Washington, D. C."